E. S. RENWICK.
Incubator.

No. 224,224.  Patented Feb. 3, 1880.

Witnesses.
H. L. Bennem
H. H. Isaacs.

Inventor.
Edward S. Renwick

UNITED STATES PATENT OFFICE.

EDWARD S. RENWICK, OF MILLBURN, NEW JERSEY.

INCUBATOR.

SPECIFICATION forming part of Letters Patent No. 224,224, dated February 3, 1880.

Application filed October 29, 1879.

*To all whom it may concern:*

Be it known that I, EDWARD SABINE RENWICK, of Millburn, in the county of Essex and State of New Jersey, have made an invention of certain new and useful Improvements in Incubators; and I do hereby declare that the following is a full, clear, and exact description and specification of the same, reference being had to the accompanying drawings.

The object of this invention is to enable the eggs in the egg-holder of an incubator to be turned with facility and automatically.

To this end my invention consists of certain new combinations of mechanical devices, which are set forth in detail at the close of this specification.

In order that my said combination may be fully understood I have represented in the accompanying drawings, and will proceed to describe, one of several manners of embodying the invention which I have devised.

Figure 1:
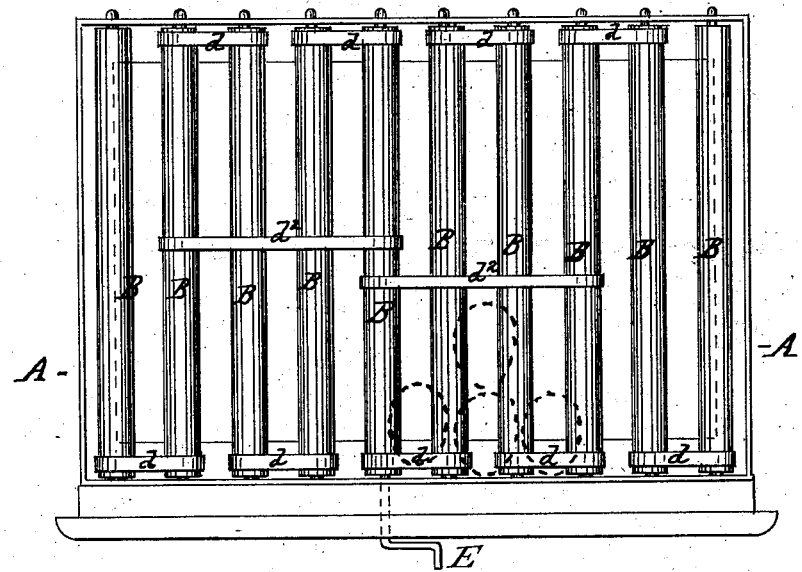
Figure 2:
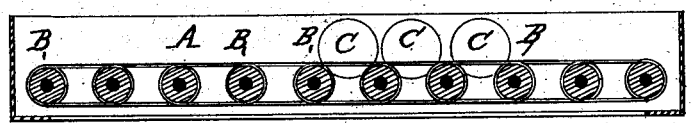

Figure 1 represents a plan of the said mode, and Fig. 2 represents a transverse section of the same.

The egg-holder in this example has the form of a tray or drawer, A, open at the bottom, and may be made of a size to fit an incubator such as those described in my Patents No. 193,616 and No. 217,148. This drawer is fitted with a series of supporting-rollers, B B, upon which the eggs C are supported. The rollers are connected with each other so as to all turn simultaneously by means of bands of elastic vulcanized rubber $d\ d$. Hence, when one of the rollers B is turned the others turn in the same direction with substantially equal surface speed, and cause the eggs to turn on their axes by the frictional contact of the surfaces of the rollers with the shells of the eggs.

One of the rollers may be turned by means of a crank, E, whose stem extends through the side of the egg-holder. If the eggs are to be turned automatically, at least one of the rollers is fitted with a ratchet-wheel, and a pawl is connected, by an eccentric or a crank, with a revolving shaft turned by a weight or other force, so that the reciprocating movement imparted to the pawl operates the ratchet-wheel and the rollers connected with it.

The pawl-shaft may form one of a train of gearing moved by a weight, like the striking mechanism of a clock, and connected, through the intervention of a detent, with a time mechanism, so that at every half-hour or other period of time the detent is loosed and the pawl mechanism is permitted to operate the ratchet-wheel one or more teeth, thus periodically turning the eggs partially on their axes.

In place of letting each egg rest on two rollers simultaneously, it may rest on one; but in this case small lateral rollers at each side of the egg are used to hold it over the supporting-roll. The eggs, also, may rest on an endless apron carried upon the supporting-rollers.

The several rollers may be all operated simultaneously by a screw extending across the rims of screw-wheels—one fitted to each roller; or an endless chain may be used for the purpose, such chain passing alternately partly around a grooved pulley secured to a roller and alternately partly around a separate loose grooved pulley pivoted to the egg-holder. I prefer, however, the combination of the rollers by rubber bands, because, as the motion is thereby imparted from one roller to another through frictional contact with their surfaces, these surfaces, which act on the eggs, will move with substantially equal speeds, although the rollers may be of different diameters. Moreover, if desired, a number of these bands may be used, as the eggs touch the rollers only at their larger circumferences and the bands may be arranged to be under the ends of the eggs. The bands may connect the rollers in adjacent pairs, and also in pairs separated from each other by one or more intermediate rollers, bands $d^2$, connecting separated rollers, being represented in the drawings.

The rollers may be plain cylinders, or may have swellings corresponding in position with the ends of the eggs; and this latter form is advantageous, because the bands will tend to run upon the swollen portions and the eggs to lie in the portions of less diameter.

I have long been aware that rolls of paper and hat-cones have been caused to revolve by supporting them upon revolving rollers; hence I do not claim, broadly, the use of two rollers for revolving an article, or the combination of two or more supporting-rollers, so that they may both revolve in the same direction with speeds that are equal or thereabout.

I claim as my invention—

1. The combination, substantially as before set forth, of the egg-holder of an incubator with supporting-rollers connected with the egg-holder by pivots, and with each other by connecting devices which cause them to revolve in the same direction.

2. The combination, substantially as before set forth, of the egg-holder of the incubator, the egg-supporting rollers, and the elastic bands which connect said rollers together and cause them to revolve in the same direction with equal surface speed.

In witness whereof I have hereto set my hand this 27th day of October, A. D. 1879.

EDWARD S. RENWICK.

Witnesses:
CHAS. A. NEALE,
F. L. OURAND.